UNITED STATES PATENT OFFICE.

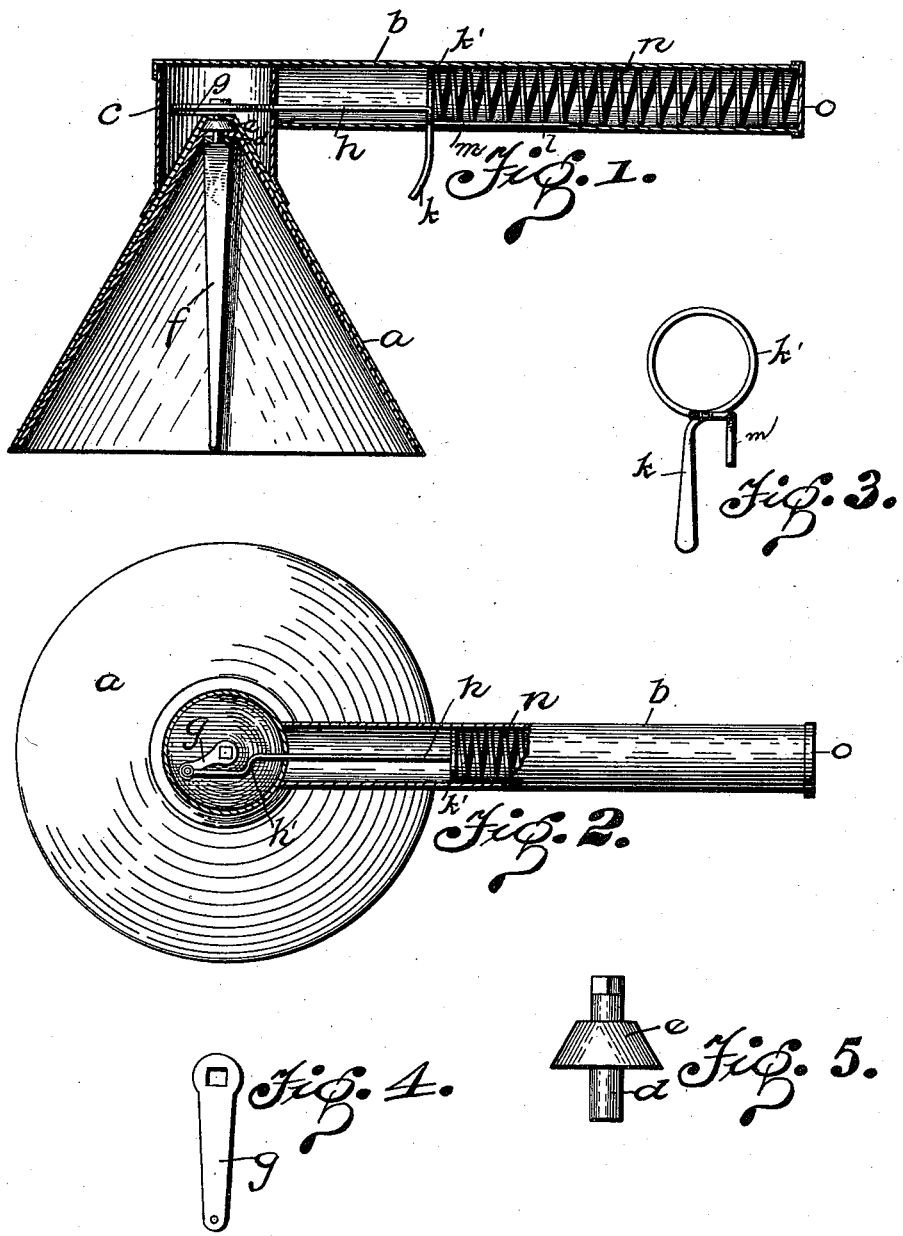

CHARLES M. BEATTY, OF TARENTUM, PENNSYLVANIA.

DISHER AND MOLD.

SPECIFICATION forming part of Letters Patent No. 578,195, dated March 2, 1897.

Application filed August 22, 1896. Serial No. 603,615. (No model.)

*To all whom it may concern:*

Be it known that I, CHARLES M. BEATTY, a citizen of the United States of America, residing at Tarentum, in the county of Allegheny and State of Pennsylvania, have invented certain new and useful Improvements in Dishers and Molds, of which the following is a specification, reference being had therein to the accompanying drawings.

This invention relates to certain new and useful improvements in dishers and molds, and has for its object to provide a disher to be employed in serving ice-cream, ices, and many other table delicacies, and which may be conveniently and easily operated with but one hand.

A further object of the invention is to construct a disher of the above-described class that will be extremely simple in its construction, strong, durable, effectual in its operation, and comparatively inexpensive to manufacture; furthermore, that it is so arranged that the cream or other substance on which it is being used will not come in contact with any of the working parts of the disher.

With the above and other objects in view the invention finally consists in the novel construction, combination, and arrangement of parts, to be hereinafter more specifically described, and particularly pointed out in the claim.

In describing the invention in detail reference is had to the accompanying drawings, forming a part of the specification and wherein like letters of reference indicate similar parts throughout the several views, in which—

Figure 1 is a vertical longitudinal sectional view of my improved disher. Fig. 2 is a top plan view, partly in section to show the operation. Fig. 3 is an end view of the handle. Fig. 4 is a plan view of the crank. Fig. 5 is a side view of the cutter and crank shaft.

Referring to the drawings by reference-letters, $a$ represents the mold, and $b$ the handle, which is secured to a cap $c$, attached to the mold, over the apex thereof. In the said apex of this mold is journaled a shaft $d$, having a bevel-bushing $e$ abutting against the top of the mold on its inner face, the lower end of said shaft carrying the cutters $f f$ and the upper end being square to receive the crank-arm $g$, in the outer end of which is pivotally secured the operating-rod $h$, curved at $h'$ and extending backward a short distance through the handle and terminating in a finger-catch $k$, which extends through the slot $l$ on the under side of the handle. This finger-catch $k$ carries a slide $m$, forming a cover for the slot $l$, and a coil-spring $n$ is arranged in the handle $b$, resting against the outer end of same and against an upwardly-extending rod $k'$, which is a part of the finger-catch and operating-rod. The handle carries on its outer end a cap $o$ to permit the insertion and removal of the spring.

The operation of my improved disher will be readily apparent from the views of the same that I have shown in the drawings, but in order to illustrate the same more clearly we will assume that the parts have been secured in their respective positions and it is desired to use the disher. The same is inserted in the cream or other substance on which it is being employed in the ordinary manner, the spring holding the rod and cutters in position. (Shown in Figs. 1 and 2.) When the mold has been filled, the operator pulls the finger-catch backward, with one of the fingers of the hand grasping the handle, thus retracting the operating-rod and causing the crank to rotate the shaft carrying the cutters, which loosen the cream from the mold and permit the same to fall on the plate or saucer provided therefor. When the pressure on the catch is released, the spring will return the rod and cutters to their normal position, and the disher is again ready for operation. By this construction the substance is prevented from coming in contact with the working parts, as during the insertion of the mold in the cream the slide $m$ will close the slot $l$, preventing the substance from entering the handle.

It will be noted that many advantages are also gained by this construction, and also that various changes may be made in the details of construction without departing from the general spirit of my invention.

Having fully described my invention, what I claim as new, and desire to secure by Letters Patent, is—

In a disher and mold, the combination of the mold, a cap secured over the apex of said mold, a handle attached to said cap and having a slot in the under side thereof, a shaft on the apex of said mold, said shaft having a square upper end and a beveled bushing thereon and cutters journaled on the lower end, a crank secured upon the upper end of the shaft, an operating-rod pivoted to said crank, a finger-catch on said rod, said catch carrying a slide, a spring in the handle and a removable cap on the outer end of said handle, substantially as shown and described.

In testimony whereof I affix my signature in presence of two witnesses.

CHARLES M. BEATTY.

Witnesses:
A. M. WILSON,
H. E. SEIBERT.